United States Patent [19]
Glassman

[11] Patent Number: 5,806,873
[45] Date of Patent: Sep. 15, 1998

[54] TRAILER FRAME TONNEAU COVER

[76] Inventor: Saly A. Glassman, P.O. Box 559, Gwynedd Valley, Pa. 19437

[21] Appl. No.: 742,779

[22] Filed: Oct. 31, 1996

[51] Int. Cl.$^6$ .................................................... B60D 1/60
[52] U.S. Cl. ........................... 280/507; 280/770; 150/166
[58] Field of Search ............... 150/166; 280/770, 280/507; D12/162

[56] References Cited

U.S. PATENT DOCUMENTS

| | | | |
|---|---|---|---|
| D. 233,229 | 10/1974 | Hershberger . | |
| D. 348,642 | 7/1994 | Wallace et al. ........................ | D12/162 |
| 5,037,122 | 8/1991 | Beckerer, Jr. ........................... | 280/507 |
| 5,058,914 | 10/1991 | Murcheson ............................ | 280/507 |
| 5,421,601 | 6/1995 | Hinze et al. ........................... | 280/507 |
| 5,527,056 | 6/1996 | Hoagland . | |

Primary Examiner—Brian L. Johnson
Assistant Examiner—Avraham Lerner
Attorney, Agent, or Firm—Gregory J. Gore

[57] ABSTRACT

A trailer tongue cover which encloses the jack mechanism is provided by a soft, lightweight protective cover which is preferably made of a flexible, yet durable, water repellent material, such as a heavy gauge vinyl. The cover includes a jack compartment which extends vertically upward from a V-shaped top portion of the cover which rests directly upon the trailer frame members. The cover is secured to the trailer frame by simple ties which pass through eyelets located on the sides of the cover and which pass underneath the frame members. The ties are preferably single drawstrings knotted at opposing side eyelets to secure the cover from being lifted off.

5 Claims, 3 Drawing Sheets

TRAILER FRAME TONNEAU COVER

FIELD OF THE INVENTION

This invention relates to covers for vehicles and, more particularly, for a trailer frame cover to provide a safety feature to prevent injury to horses.

BACKGROUND OF THE INVENTION AND DESCRIPTION OF PRIOR ART

Some horse trailers, like other utility vehicle trailers, generally include a V-shaped tongue which extends from the front of the trailer. The tongue carries the trailer hitch assembly at its apex and also a manually-cranked jack, which both supports the front of the trailer when it is unhitched and may be used to raise and lower the front of the trailer to facilitate connecting the hitch or leveling the trailer. The base of the jack usually carries a caster wheel which permits the trailer to be maneuvered while it is unhitched.

A problem that is often encountered is caused by the gaps between the trailer frame members in the area of the tongue. These gaps create a dangerous condition because children playing in the area can step through the frame gaps, thus causing leg injuries and possibly fractures. Also, the portion of the jack assembly which extends vertically from the top of the trailer tongue presents a dangerous protrusion which could cause injuries. Furthermore, there is a need for a cover to protect the hitch and jack mechanism from harmful weather conditions.

The closest patent art of which the applicant is aware includes U.S. Pat. No. 5,527,056, entitled "Trailer Hitch Cover", issued Jun. 18, 1996. The cover disclosed in this patent is an assembly of rigid, planar plastic panels which are interconnected to box in the entire front area of a horse trailer frame from the ground level to a point above the vertically-extending jack post. This full-enclosure type of cover comprises an assemblage of top and side panels which interlock into a triangular shaped base. The base is situated on the ground under the jack and is held in place solely by the weight of the jack. The problem with this device is that it is complex, expensive and difficult to store when not in use because of its size and weight. This is a particular concern because it cannot be left in place while the trailer is being towed and thus must be carried in the trailer or the tow vehicle where storage space is limited. Also, it therefore cannot offer any advantage while traveling.

U.S. Pat. No. Des. 223,229, entitled "Mobile Home Hitch Cover", issued Oct. 15, 1974, is a design for a hitch cover for the front of the mobile home to enhance the appearance of the mobile home when it is parked. The cover described in this patent is not collapsible and no means of attachment are disclosed. Thus, it would be highly unsuitable to serve as a horse trailer hitch cover with the safety and portability requirements described above.

There is therefore an unfulfilled need in the art for a trailer tongue hitch cover which is uncomplicated, inexpensive, easily attached and removed, and that covers trailer frame tongue gaps, as well as the vertically protruding jack post. There is also a need for a trailer hitch cover which meets these requirements that may be left in place while the vehicle is in tow, thus providing the additional advantages of protecting the jack mechanism and trailer wiring from the corrosive effects of rain or snow.

SUMMARY OF THE INVENTION

In order to meet the needs in the art for a better trailer tongue enclosure, the present invention has been devised. The invention employs a soft lightweight, protective cover which is is preferably made of a flexible, yet durable, and water repellent material, such as a heavy gauge vinyl. Any material used should be appropriate for cutting and sewing together along the various seams as depicted in the drawings which follow. The cover of the present invention is installed from above and rests directly upon the top of the trailer frame members. The cover further includes side portions which are located to closely follow the contours of the trailer frame members to cover their sides. The cover is secured to the trailer frame by simple ties which pass through eyelets located on the cover side portions underneath the frame members. The ties are preferably single drawstrings knotted at opposing side eyelets to secure the cover from being lifted off.

More specifically, the applicant has invented a trailer frame cover for a wheeled vehicle trailer having a frame which includes frame members that converge from the sides and that terminate at the forward-most point to an apex forming a V-shaped tongue with open spaces between the frame members and further including an upward extending jack mechanism, comprising a soft cover resting directly upon the frame members and completely covering over the spaces and the jack mechanism. A V-shaped top portion of the cover rests directly upon the frame members and side portions extend below the right and left sides. A jack compartment extends vertically upward from the top portion. The cover, preferably composed of a vinyl-coated fabric, extends forward to a point beyond a hitch affixed to the frame at the apex, thus completely covering the hitch. The cover further includes drawstrings which travel between opposite left and right side portions of the cover to attach the cover to the frame.

Other objects, advantages and novel features of the invention will become apparent from the following detailed description of the invention when considered in conjunction with the accompanying drawings.

DESCRIPTION OF THE PREFERRED EMBODIMENT

Figure 1:
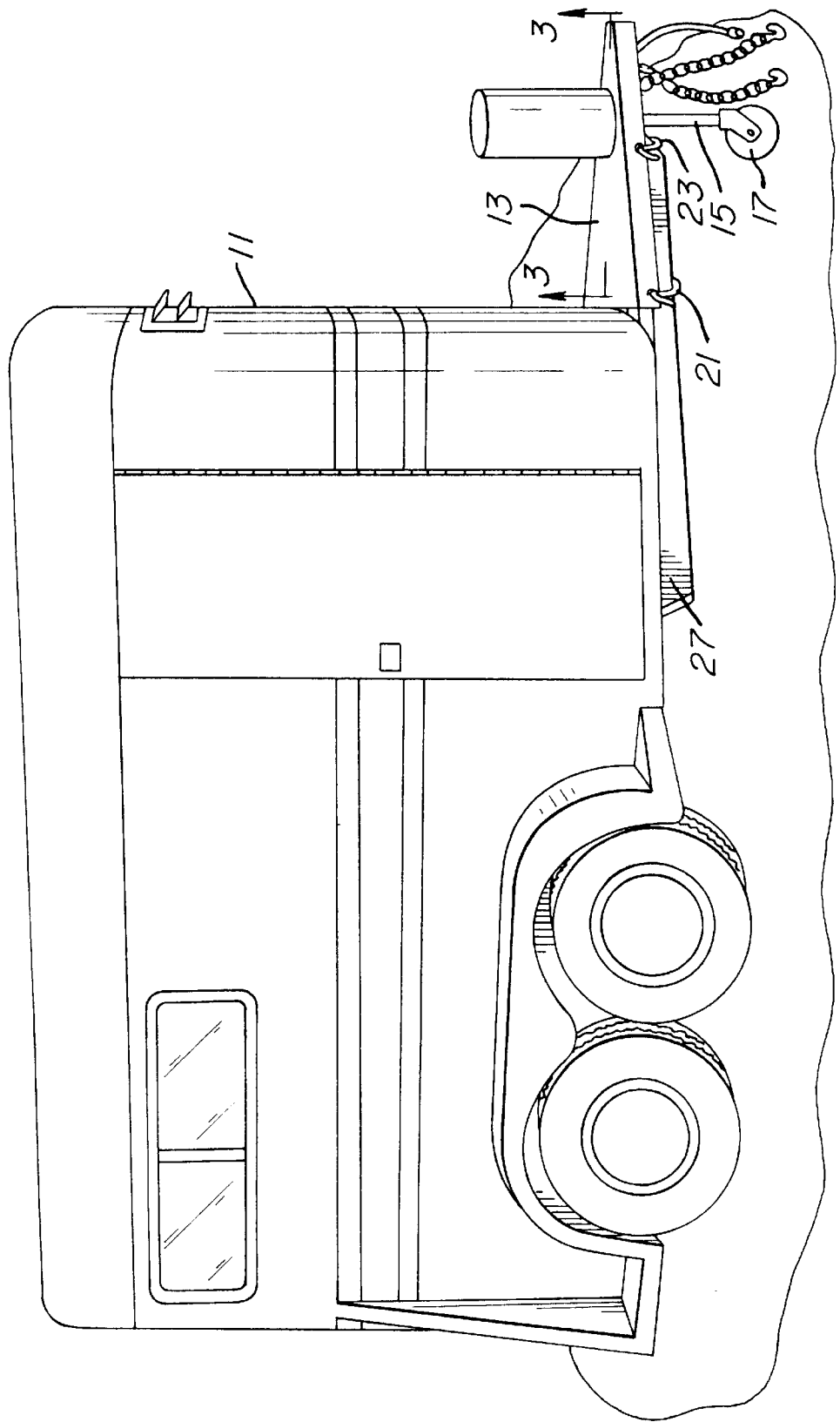
FIG. 1 is a front left side isometric view of the present invention installed on a horse trailer frame.

Referring now to FIG. 1, a typical horse trailer is shown in a parked position detached from a tow vehicle not shown in this figure. The trailer includes main body portion 11 which rests upon frame members 27 that extend forward of the trailer body. The outside-most frame members are angled toward the center from the sides to an apex where a hitch is located. The cover of the present invention 13 is shown in this figure installed over the V-shaped trailer frame secured by ties 21 and 23. The trailer also includes a jack mechanism which includes a jack post 15 that extends below the trailer frame to a caster wheel 17.

Figure 2:
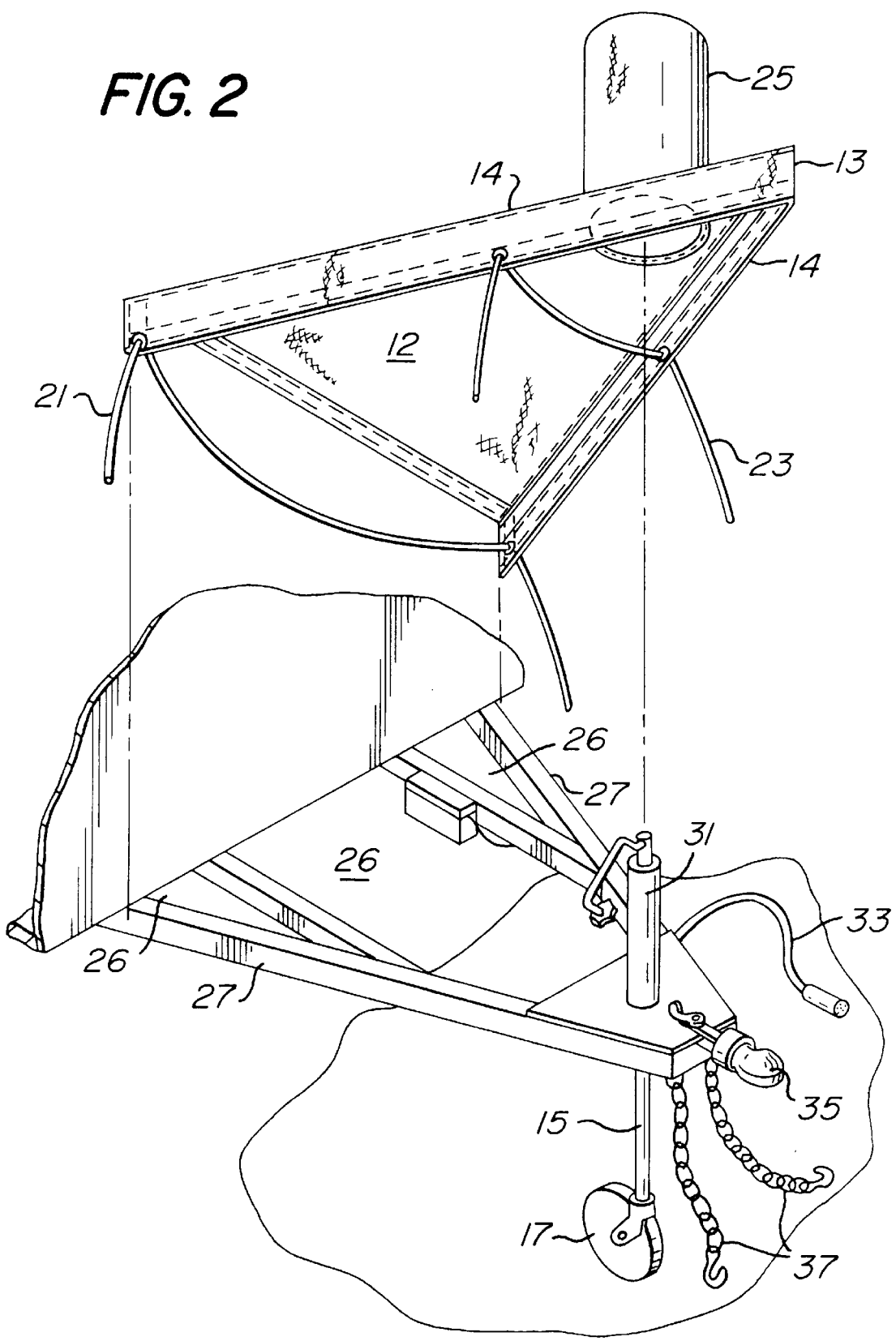
FIG. 2 is a top left front exploded isometric view of the trailer cover and the V-shaped tongue area of the trailer frame.

FIG. 2 shows the greater detail of the tonneau-type cover of the present invention and its position in relation to the structural features of the trailer tongue. As seen in this figure, open gaps 26 occur between trailer frame members 27. Also, the jack mechanism 31 includes sharp metal structures which protrude vertically upward from the top of the tongue at the front. It is these areas that present the potentially hazardous elements of the exposed trailer tongue which the present invention is designed to enclose.

In this figure, the jack post 15 and jack post wheel 17 are again shown with other features of the horse trailer which include the trailer electrical wiring 33, the trailer hitch 35, and safety chains 37. The tonneau cover 13 includes three main elements; a V-shaped top portion 12, right and left side portions 14, and a vertically upward-extending cylindrical compartment 25 which houses the jack mechanism 31. These elements are stitched together from separate pieces sewn along seams where they are joined. Front and rear drawstring ties 23 and 21 respectively secure the cover when installed as further shown in FIG. 3. The cover is preferably composed of any material which is lightweight, flexible and durable, such as a vinyl-coated fabric. It is also desirable to employ a material which is waterproof.

Figure 3:
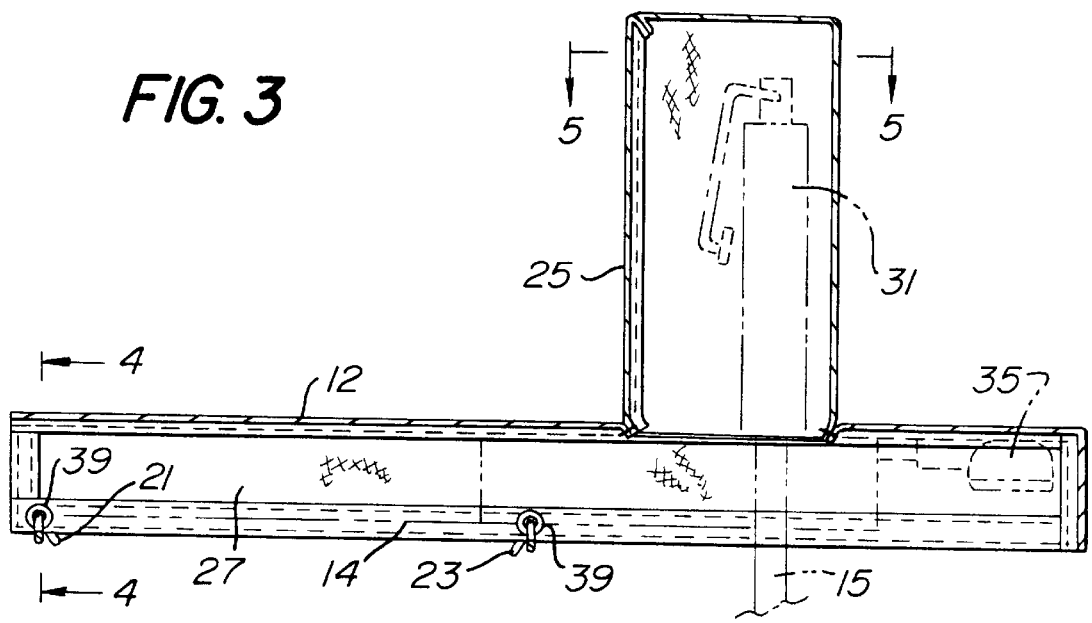
FIG. 3 is a left side sectional view taken from FIG. 1 as shown in that figure.

Referring now to FIG. 3, a side sectional view of the cover of the present invention installed over the trailer frame tongue is shown. As clearly seen in this figure, the vertical compartment 25 completely encloses the jack mechanism 31 which retracts and extends jack post 15. The vertical compartment may extend upward to a point which comfortably accommodates the top of the jack even when it is retracted upward in its towing position. The top portion 12 of the cover is disposed horizontally from a point in front of the trailer hitch 35 resting directly across the top of the frame 27 and extends rearward to the trailer body. Front tie 23 and rear tie 21 pass through eyelets 39 which are located along the bottom edges of the side portions 14 of the cover.

Figure 4:
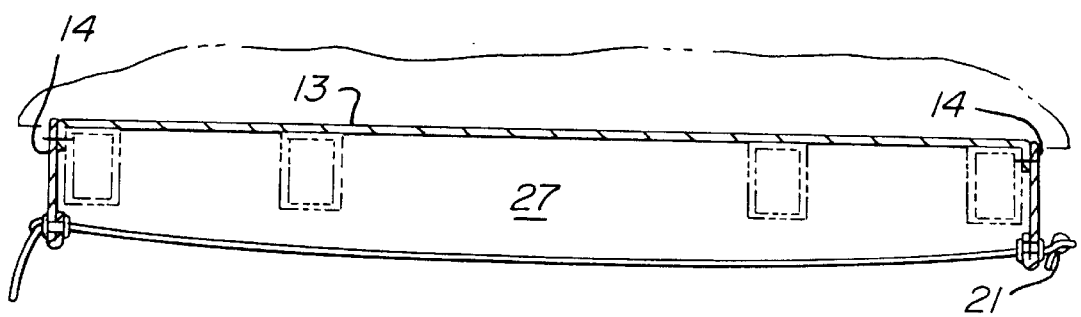
FIG. 4 is a front sectional view of the present invention taken from FIG. 3 as shown in that figure.
Figure 5:
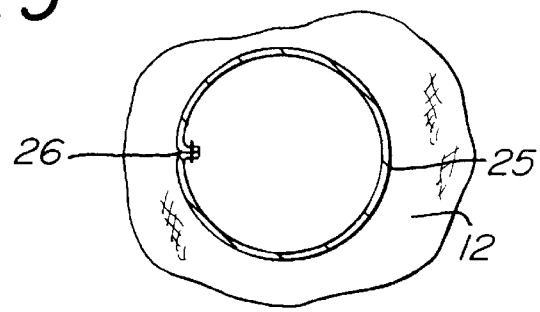
FIG. 5 is a plan sectional view taken from FIG. 3 as shown in that figure.

As shown in FIG. 4, the rear tie 21 passes beneath trailer frame members 27 encircling them across the bottom, thus securing the cover 13 from being lifted off. The ties as shown in this embodiment may take the form of simple drawstrings which are knotted on the opposite sides of the right and left side portions 14 of the cover. FIG. 5 shows a top sectional view of the jack mechanism compartment 25 which extends vertically from the top portion 12 of the cover. The compartment is substantially cylindrical and formed from a single piece of material which is joined by stitching along vertical seam 26.

The present invention as described above offers many advantages over the prior art. For example, the cover may be left on while traveling, or while the trailer remains hitched to the tow vehicle. This is not possible with full-enclosure type covers. Furthermore, because the cover may be left in place while traveling, it protects the various elements of the jack mechanism and the trailer electrical wiring from the harmful environment of rain or snow at all times. An additional advantage of the present invention is that it may be folded into a small compact volume for easy handling and storage. Furthermore, it may be easily attached and removed because it is composed of a minimal amount of flexible, lightweight materials. It is also therefore extremely convenient and economical.

It should be understood that the above description discloses specific embodiments of the present invention and are for purposes of illustration only. There may be other modifications and changes obvious to those of ordinary skill in the art that fall within the scope of the present invention which should be limited only by the following claims and their legal equivalents.

I claim:

1. A flexible trailer cover in combination with a wheeled vehicle trailer having a frame which includes frame members that converge from the sides and that terminate at the forward-most point to an apex forming a V-shaped tongue with open spaces between said frame members in the area of the tongue, and further including an upward extending jack mechanism, comprising:

a main cover resting directly upon said frame members and completely covering over said spaces and said jack mechanism, said main cover resting in place while said trailer is being towed.

2. The cover of claim 1, further comprising a V-shaped top portion which rests directly upon said frame members, side portions which extend below the right and left side of said frame members, and a jack compartment vertically extending upward from said main cover.

3. The cover of claim 2, further described in that said cover extends forward to a point beyond a hitch affixed to said frame at said apex, thus completely covering said hitch.

4. The cover of claim 3, further including drawstrings which travel between opposite left and right side portions of said cover to attach said cover to said frame.

5. The cover of claim 4, wherein said cover is composed of a vinyl-coated fabric.

\* \* \* \* \*